Aug. 10, 1965  D. L. JAFFEE  3,199,482
CONTROL MECHANISM
Filed Jan. 9, 1963  3 Sheets-Sheet 1
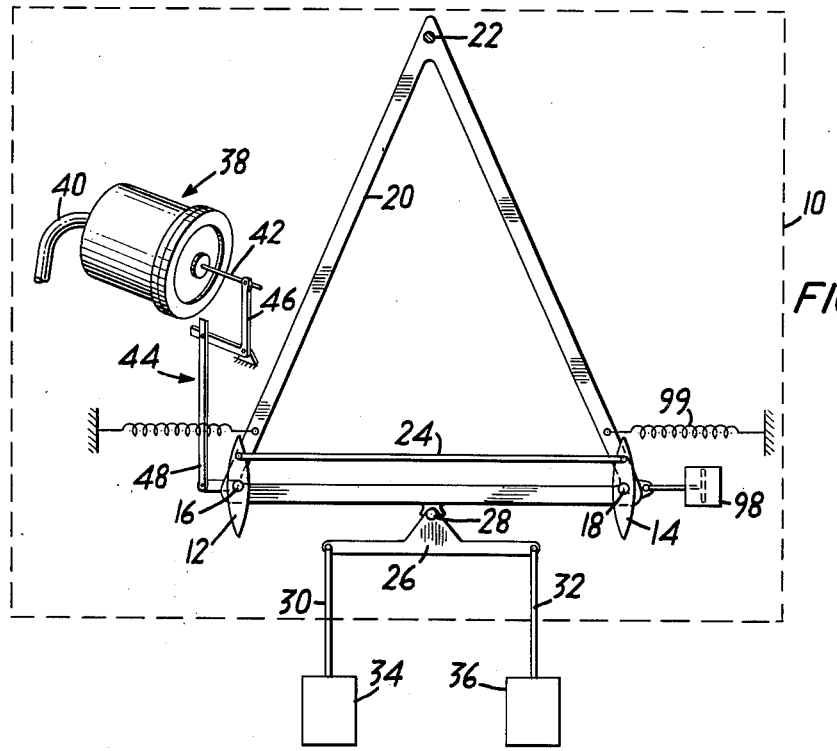
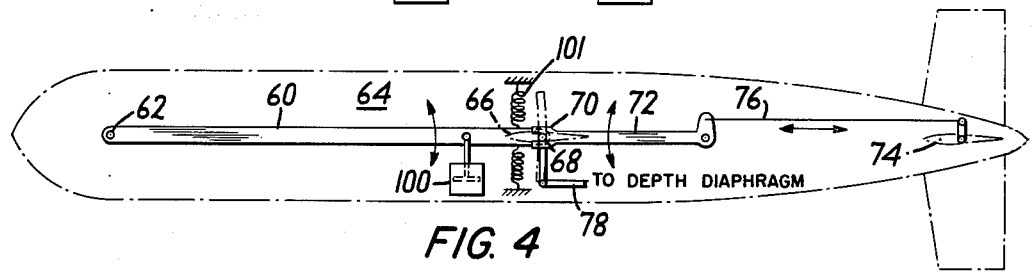
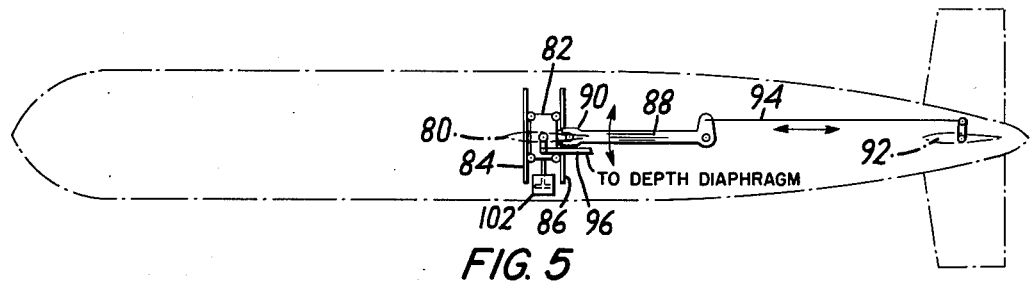
INVENTOR.
DANIEL L. JAFFE

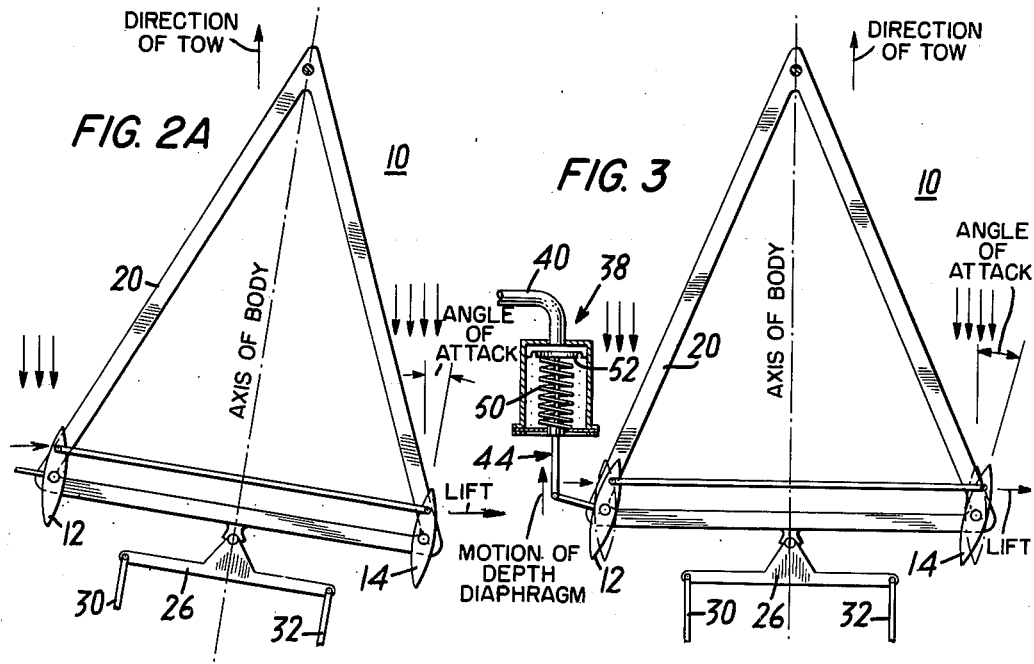
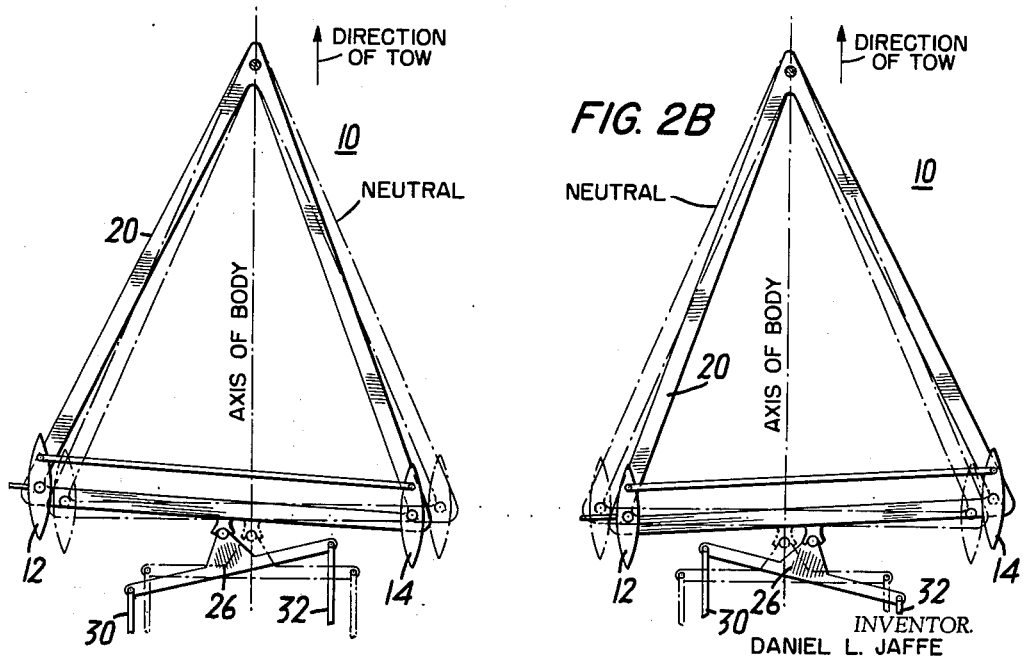

Aug. 10, 1965  D. L. JAFFEE  3,199,482
CONTROL MECHANISM
Filed Jan. 9, 1963  3 Sheets-Sheet 3

INVENTOR.
DANIEL L. JAFFE
BY
his ATTORNEYS

United States Patent Office ──

3,199,482
Patented Aug. 10, 1965

3,199,482
CONTROL MECHANISM
Daniel L. Jaffee, Bethesda, Md., assignor to Vitro Corporation of America, New York, N.Y., a corporation of Delaware
Filed Jan. 9, 1963, Ser. No. 250,373
11 Claims. (Cl. 114—16)

The present invention relates to improvements in control devices, and, more particularly, to devices for controlling the attitude and position of bodies immersed in a fluid medium with relative motion therebetween.

Bodies, immersed in, and towed or self-propelled through fluids, as for example, underwater sleds, ocean survey platforms and various types of aircraft or other vehicles, must be statically and dynamically stable so that their varied purposes can be properly accomplished.

Axial disorientation of a body immersed in and having relative motion with respect to a fluid medium, such as water, arising from external forces and causing an undesirable yaw, pitch or roll, is a type of disturbance which must be overcome and compensated for. Another type of disturbance involves a displacement of the body in position, such as depth, caused, for example, by external forces produced by vertical currents or wave motion. An unsatisfactory or unstable control response to overcome these disturbing forces may prevent the immersed body from accomplishing its intended purpose. If the control response is sufficiently violent and unstable the body may be damaged or destroyed.

Some known forms of automatic stabilizing or control devices for use with towed or self-propelled immersed bodies, responding only to static pressure variations, have not satisfactorily compensated for the effect of such external disturbing forces. These stabilizing devices do not properly damp disturbing and recovery forces and thus impart on oscillatory or "hunting" motion about the desired position.

Other known forms of control apparatus using mechanical or electrical pendulums or gyroscopes have failed to satisfy a general need for an accurate, inexpensive and lightweight control device. Pendulum devices, such as the mercury column, are subject to acceleration error and may require complex electrical controls. Gyroscopic systems are expensive and also require electrical controls.

These and other disadvantages of devices heretofore available may be overcome by providing means for directly sensing and responding to dynamic and static pressure changes within the immersing fluid. In accordance with the invention, the sensing elements, immersed in the fluid, may respond to detected static and dynamic pressure changes by actuating a control mechanism to correct the disorientation and positional changes of the immersed body induced by disturbing forces.

In an exemplary embodiment of the invention, an inexpensive and lightweight dynamic pressure sensing device, for example, a hydrofoil, may be used to detect dynamic forces caused by changes in the axial orientation of an immersed body. The dynamic pressure sensing device may transmit an error signal, representative, for example, of the lift force perpendicular to the direction of fluid flow, to a responsive control surface to influence the return of the immersed body to a desired orientation and thereby decrease dynamic forces caused by the initial disorientation. Displacements from a predetermined position relative to a reference plane are corrected by means of a static pressure sensing device which sends an error signal to a responsive control surface to cause the return of the immersed body to the same relative position thereby decreasing the pressure differential. The error signals fed to the signal responsive control surface may comprise a signal responsive to a change in axial orientation, or to a change in position, or a combined position and orientation signal.

For a more complete understanding of the present invention reference may be had to the following detailed description taken in conjunction with the accompanying figures of the drawings, in which:

FIGURE 1 is a plan view in longitudinal cross section of an exemplary embodiment of a control mechanism, in accordance with the invention;

FIG. 2A is a schematic drawing of the embodiment of the invention shown in FIG. 1 under the influence of a disturbing force acting in one direction in accordance with one mode of operation;

FIG. 2B is a schematic drawing of the embodiment of the invention shown in FIG. 2A during the recovery sequence from the disturbing force indicated in FIG. 2A;

FIG. 2C is a schematic drawing of the embodiment of the invention shown in FIG. 2A during a phase in the recovery sequence from a differently directed disturbing force;

FIG. 3 is a schematic drawing of the embodiment of the invention shown in FIG. 2A in a different mode of operation, along with details of the pressure sensing device;

FIG. 4 is a side elevational view of another exemplary embodiment of the invention incorporated in an immersed body of a different design than the exemplary design shown in FIG. 1;

FIG. 5 is a side elevational view of still another exemplary embodiment of the invention incorporated in an immersed body of the same design as that shown in FIG. 4.

Figure 6:
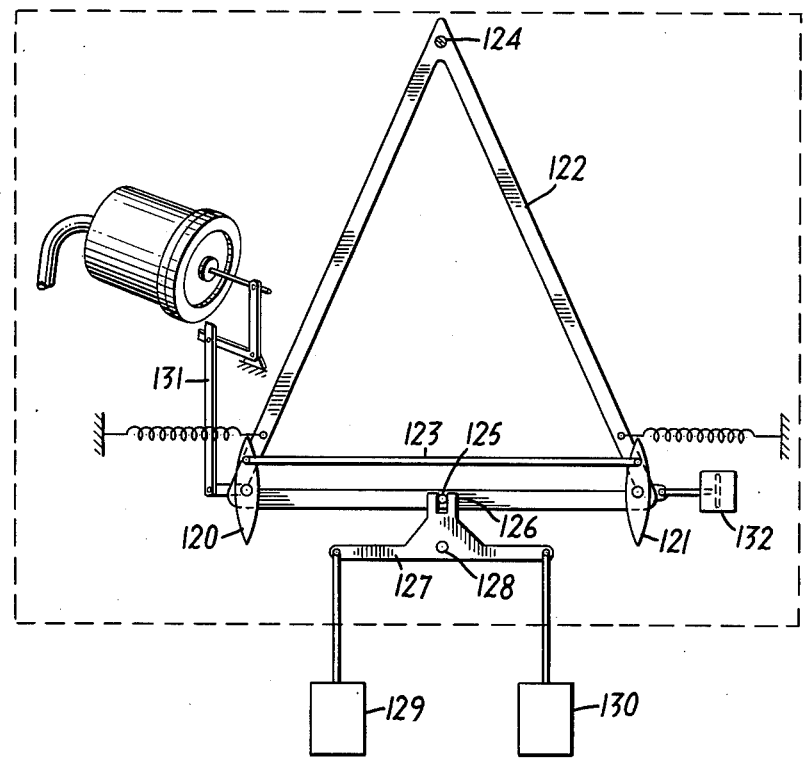
FIG. 6 is a plan view in longitudinal cross section of still another exemplary embodiment of the invention incorporated in an immersed body of the same general design as that shown in FIG. 1.

The control mechanism shown in the exemplary embodiment of FIG. 1 stabilizes a submersible body 10 of any suitable conventional form such as an underwater sled or an ocean survey platform, which can be towed or self-propelled underwater. The control mechanism is provided with a number of inter-related control elements including dynamic sensing means, the motion of which is restrained to a plane substantially perpendicular to the axis of the submersible body so as to develop a control or error signal when they detect a change in attitude.

Two attitude sensing means 12 and 14 are shown in FIG. 1 as lift-generating hydrofoils, which are mounted by means of pivots 16 and 18 to respective ends of each of the two equal legs of an A frame 20 formed substantially in the shape of an isosceles triangle. The sensing means 12 and 14 are positioned on the A frame 20 in such a way that the chord lines of the sensing elements are parallel to each other while the spans of the sensing means 12 and 14 are normal to the plane of the A frame 20. A rod 24 joining the two sensing means 12 and 14 unites the pivotal movement of the sensing means such that the chord lines of the sensing means will always be parallel irrespective of the angle through which either of the sensing means is pivoted.

The triangular shape of the A frame 20, selected to suitably fit the interior shape of the submersible body 10, is mounted within the submersible body 10 by means of a pivot 22 normal to the apex of the triangle, thereby permitting the A frame 20 to rotate in the plane established by the triangle. Pivotal motion of the A frame 20 is transmitted to a motion translating mechanism 26 through a connection 28.

The mechanism 26, which is in the form of a singletree, is linked to two actuating rods 30 and 32. The actuating rods 30 and 32 activate control members 34 and 36 which may utilize any suitable, effective, known form of immersed body control such as rudders, fins, jets of fluid or the like.

A hydrostatic pressure sensing means 38, conveniently shown here in the form of a simple diaphragm gage, which can be of a conventional, adjustable type, is provided with a static pressure tube 40 in free communication with the immersing fluid in which the submersible body 10 is located to render the pressure sensing means 38 responsive to the static pressure of the fluid medium. An actuating rod 42, responsive to diaphragmatic flexure of the pressure sensing means 38 is directly connected to the attitude sensing means 12 by a conventional linkage 44, schematically shown in FIG. 1, comprising a bell crank mechanism 46, and an activating rod 48. The movement of the actuating rod 42 imparted to the attitude sensing means 12 and to the attitude sensing means 14 by the rod 24 causes the attitude sensing means to pivot through an angle proportionate to the degree of flexure impressed upon the hydrostatic pressure sensing means 38 by the immersing fluid. Thus static pressure changes registered by the hydrostatic pressure sensing means 38 can be combined with the operation of the attitude sensing means 12 and 14 to provide an error signal to the control members 34 and 36.

In operation, the aforementioned control elements cooperatively functioning in the control mechanism constitutes a compensating control loop.

As shown in FIGS. 2A, 2B, and 2C an axial displacement of the submersible body 10 relative to the direction of tow or motion causes the attitude sensing elements 12 and 14 to be angularly displaced relative to the direction of the free stream flow. The new angle of attack thus formed between the attitude sensing elements, 12 and 14, and the direction of free stream flow provides a lifting force. The lifting force thus generated is an hydrodynamic error signal acting to pivot the A frame 20 in a counter-clockwise direction, as seen in FIG. 2B. The movement of the A frame 20 could have appropriately been in a clockwise direction, as seen in FIG. 2C, in response to a different angular relationship between the displacement of the submersible body 10 and the direction of free stream flow.

As shown in FIG. 2B the pivotal motion of the A frame 20 induced by the hydrodynamic error signal causes the mechanism 26 to translate and pivot, thereby activating the control members 34 and 36 through the actuating rods 30 and 32. The control members 34 and 36 respond to the hydrodynamic error signal by causing the submersible body 10 to decrease the angle of attack between the attitude sensing means 12 and 14 and the direction of free stream flow or movement. Thus the control members provide a correction in response to the hydrodynamic error signal of the attitude sensing elements tending to decrease and eliminate the source of the hydrodynamic error signal by restoring the submersible body 10 to the proper angular orientation relative to the direction of free stream flow as shown in the dotted outline in FIG. 2B, wherein the A frame 20 is in the equilibrium or neutral position.

The pressure sensing means 38 provides a hydrostatic error signal input to the compensating control loop. As shown in FIG. 3, the pressure sensing means 38 is subjected to hydrostatic pressure through the static pressure tube 40. A displacement in depth of the immersed body 10 registered on the pressure sensing means 38 through the static pressure tube 40 causes the linkage 44 to pivot the attitude sensing elements 12 and 14 relative to the direction of free stream flow. Thus the angle of attack created between the attitude sensing elements 12 and 14 and the direction of free stream flow by the operation of the hydrostatic pressure sensing means 38 generates a lift force on the attitude sensing elements appropriately pivoting the A frame 20. The pivotal movement of the A frame 20 causes the mechanism 26 to translate and pivot, actuating the control members 34 and 36 in the manner hereinbefore described.

The movement of the control members 34 and 36, responding to correct the hydrostatic error signal caused by the displacement of the submerged body in depth, diminishes and ultimately eliminates the hydrostatic pressure error signal.

Both the pressure sensing means 38 and the attitude sensing means 12 and 14, can function jointly or independently of each other to correct displacements in depth and axial disorientations, respectively. The conventional adjustable feature, shown in FIG. 3, which may be incorporated in the pressure sensing means 38 may be used to select a specific equilibrium depth at which no hydrostatic error signals are impressed upon the compensating control loop by balancing the force imposed by a spring 50 on a water tight diaphragm 52 against the hydrodynamic pressure at the equilibrium depth.

The hydrodynamic and hydrostatic pressure error signals induced by the attitude sensing elements 12 and 14, as well as the pressure sensing means 38, and the correction induced by the control members 34 and 36 provides a stable compensating control loop, as hereinbefore mentioned. Power amplification or boost is unnecessary for the activation of the control mechanism if the control members 34 and 36, and the attitude sensing elements 12 and 14, are in balance. It may be desirable, however, to provide some damping means, for example, as shown in FIG. 1, an appropriately positioned dash pot 98, to suppress any oscillatory characteristics which might develop within the compensating control loop. A centering device 99, conveniently shown in the form of a pair of springs, may also be used with the control mechanism to assist in returning the apparatus to a neutral position.

Another embodiment of the invention is shown in FIG. 4. A control mechanism including a longitudinal arm 60 pivoted at the forward end 62 of a submersible body 64 supports an attitude sensing element 66 at the opposite, free and unpivoted end of the arm 60. A pivot 68, about which the sensing element 66 rotates also engages a fork 70 formed in the forward end of a bell crank mechanism 72. The bell crank mechanism 72 activates a control surface 74 through a conventional linkage 76. An hydrostatic error signal can be imposed upon the correction loop through a pressure sensing device (not shown) and a connecting linkage 78 capable of pivotally actuating the attitude sensing element 66. A dash pot 100 and a centering device 101 may also be used to dampen oscillations and center the attitude sensing element 66.

Another embodiment of the invention is illustrated in FIG. 5. An attitude sensing element 80 is pivotally mounted on a wheeled carriage or guide means 82 constrained by rails 84 and 86 to restrain the movement of the attitude sensing element 80 to a fixed path. A bell crank mechanism 88, engaging a pivot 90 on the attitude sensing element actuates a control surface 92 through a conventional linkage 94. An hydrostatic error signal can be impressed in the manner hereinbefore described upon the attitude sensing element 80 through a linkage 96 capable of pivotally actuating the attitude sensing element 80. Damping of any oscillations which might develop within the control mechanism can be accomplished in the manner hereinbefore described by means of a dash pot 102.

In the embodiment of FIG. 6, a pair of attitude sensing elements 120 and 121 are ganged for pivotal movement of an A frame 122 by a rod 123 in the manner hereinbefore described with reference to FIG. 1. The A frame 122 is mounted within the submersible body by a pivot 124. Pivotal motion of the A frame 122 caused by the sensing elements 120 and 121 is transmitted by a pin and fork arrangement, as in the embodiments of FIGS. 4 and 5, including a pin 125 on the A frame 122 and a fork 126 on a bell crank mechanism 127. The bell crank mechanism 127 is pivoted with respect to the submersible body at a pivot point 128, to activate the control members 129 and 130 in the manner described in connection with the previous embodiments of the invention. Hydrostatic error signals may also be impressed on the sensing elements 120 and 121 through a linkage 131 and oscillations can be dampened by a dash pot 132, in the same manner, as that described with respect to FIG. 1.

In operation these embodiments of the invention function in the same manner as the depth control mechanism described in connection with the submersible body.

As is apparent from the foregoing, the present invention provides an apparatus for the stabilization and positional control of bodies functioning in a moving fluid.

It will be obvious to those skilled in the art that the above described exemplary embodiments are susceptible of modification and variation without departing from the spirit and scope of the invention. For example, some of the functions of the mechanical apparatus herein described can be accomplished by the substitution of hydraulic, pneumatic or electrical devices to restrain the motion of the sensing elements to a plane perpendicular to the axis of the submersible body, and to produce and transmit error signals representative of the force generated by the change in attitude of the body. Thus the invention is not deemed to be limited except as defined by the depending claims.

I claim:
1. A device for restoring the axial orientation and position of a body functioning in a fluid medium, with relative motion therebetween, to a predetermined orientation and position, comprising dynamically actuated sensing means susceptible of controlled orientation relative to the axis of the body and responsive to the axial orientation of the body within the immersing fluid for providing error signals, static pressure sensing means for controlling the orientation of said dynamically actuated sensing means, orientation control means, and a substantially triangular pivoted frame for activating said orientation control means in response to said error signals to provide a control response diminishing the change in the axial orientation, whereby the axial orientation of the body is restored.

2. A device for restoring the axial orientation and position of a body functioning in a fluid medium, with relative motion therebetween, to a predtermined orientation and position, comprising dynamically actuated sensing means susceptible of controlled orientation relative to the axis of the body and responsive to the axial orientation of the body within the immersing fluid for providing error signals, static pressure sensing means for controlling the orientation of said dynamically actuated sensing means, crank means for providing an orientation control response, and a substantially triangular pivoted frame for activating said crank means to diminish the change in the axial orientation, whereby the axial orientation of the body is restored.

3. A device for restoring the axial orientation and position of a body functioning in a fluid medium, with relative motion therebetween, to a predetermined orientation and position, comprising a plurality of sensing means susceptible of controlled orientation relative to the axis of the body and activated by dynamic pressure differences and responsive to the axial orientation of the body, a mechanical linkage fixing said plurality of sensing means in substantially parallel relationship, static pressure sensing means for controlling the orientation of said dynamically activated sensing means, crank means to provide an orientation control response diminishing the change in the axial orientation, whereby the axial orientation of the body is restored, and a substantially triangular pivoted frame actuated by said sensing means for activating said crank means.

4. In a device for restoring the axial orientation and position of a body functioning in a flud medium, with relative motion therebetween, to a predetermined orientation and position, comprising at least one hydrofoil susceptible of controlled orientation relative to the axis of the body and in contact with the immersing medium, static pressure sensing means for controlling the orientation of said hydrofoil, an arm having one extremity pivotally attached to the immersed body and another extremity of said arm pivotally supporting said hydrofoil, for movement therewith, at least one orientation control surface, and motion translating means activated by said hydrofoil for actuating said control surface, whereby the axial orientation of the body is restored.

5. In a device for restoring the axial orientation and postion of a body functioning in a fluid medium, with relative motion therebetween, to a predetermined orientation and position comprising a movable carriage, at least one hydrofoil in contact with the immersing medium pivotally connected to said movable carriage for movement therewith, static pressure sensing means for controlling the pivotal orientation of said hydrofoil relative to the axis of the body, guide means for controlling the movement of said hydrofoil and said movable carriage, at least one responsive orientation control surface, and motion translating means activated by the movement of said hydrofoil for actuating said control surface in proportionate response thereto whereby the axial orientation of the body is restored.

6. A device for restoring the axial orientation and position of a body functioning in a fliud medium, with relative motion therebetween, to a predetermined orientation and position, comprising dynamically actuated sensing means susceptible of controlled orientation relative to the axis of the body and static pressure sensing means responsive to the axial orientation and position of the body within the immersing fluid, respectively, for providing error signals, said static pressure sensing means controlling the orientation of said dynamically actuated sensing means to provide an error signal for restoring the body to the predetermined position within the immersing fluid, and a compensating control loop including at least one control means activated by said static and dynamic error signals to provide a control response diminishing the change in the axial orientation and the position, whereby the axial orientation of the body is restored.

7. In a device for stabilizing and controlling changes in the motion of a moving immersed body, a compensating control loop, comprising a plurality of hydrofoils in contact with the immersing medium, a substantially triangular frame having a base for pivotally mounting said plurality of hydrofoils thereon in approximately perpendicular relationship thereto, a mechanical linkage ganging said hydrofoils to pivot uniformly, an hydrostatic pressure sensing means in free communication with the immersing fluid, mechanical means joining said mechanical linkage with said hydrostatic pressure sensing means for uniformly pivoting said plurality of hydrofoils in response to immersing fluid pressure changes, means for pivotally connecting the apex of said triangular frame to the immersed body restraining said frame to move in the plane of said triangle, a plurality of control members, and a bell crank mechanism activated by said triangular frame to transmit an error signal from said plurality of hydrofoils and said hydrostatic pressure sensing means therethrough to said plurality of control members to reduce the changes in the motion of the moving body, whereby the compensating control loop stabilizes and controls the changes in the motion of a moving immersed body.

8. In a device for stabilizing and controlling changes in the motion of a moving immersed body, a compensating control loop, comprising at least one hydrofoil in contact with the immersing fluid, an arm, one extremity of said arm pivotally attached to the immersed body, the opposite extremity of said arm pivotally supporting said hydrofoil, a hydrostatic pressure sensing means in free communication with the immersing fluid and responsive to pressure changes therein, a first mechanical linkage adapted to pivot said hydrofoil in response to said hydrostatic pressure sensing means, a bell crank mechanism having a plurality of arms and pivotally attached to the immersed body at the junction of said arms, one arm of said bell crank mechanism movably engaging said hydrofoil, a second mechanical linkage, and at least one actuable control surface adapted to reduce the changes in the motion of the moving body, the other arm of said bell crank mechanism activating said second mechanical linkage to transmit error signals therethrough to actuate said control surface, whereby the compensating control loop stabilizes and controls the changes in the motion of a moving immersed body.

9. In a device for stabilizing and controlling changes in the motion of a moving immersed body, a compensating control loop, comprising a movable carriage, at least one hydrofoil in contact with the immersing fluid pivotally connected to said movable carriage, a first mechanical linkage adapted to pivot said hydrofoil, a hydrostatic pressure sensing means in free communication with the immersing fluid and responsive to pressure changes therein for controlling said first mechanical linkage, guide means for controlling the movement of said carriage relative to the immersed body, a bell crank mechanism having a plurality of arms and pivotally attached to the immersed body at the junction of said arms of said bell crank mechanism, one of said arms of said bell crank mechansim movably engaging said hydrofoil, at least one control surface adapted to reduce the changes in the motion of the moving body, and a second mechanical linkage, said other arm of said bell crank mechanism activating said second mechanical linkage to transmit error signals therethrough to said control surface, whereby the compensating control loop stabilizes and controls the changes in the motion of a moving immersed body.

10. In a device for stabilizing and controlling changes in the motion of a moving immersed body, a compensating control loop, comprising a plurality of hydrofoils in contact with the immersing medium, a substantially triangular frame having a base for pivotally mounting said plurality of hydrofoils thereon in approximately perpendicular relationship thereto, a mechanical linkage ganging said hydrofoils to pivot uniformly, a hydrostatic pressure sensing means in free communication with the immersing fluid, mechanical means joining said mechanical linkage with said hydrostatic pressure sensing means for uniformly pivoting said plurality of hydrofoils in response to immersing fluid pressure changes, means for pivotally connecting the apex of said triangular frame to the immersed body restraining said frame to move in the plane of said triangle, a plurality of control members, and motion translating mechanism activated by said triangular frame to transmit an error signal from said plurality of hydrofoils and said hydrostatic pressure sensing means therethrough to said plurailty of control members to reduce the changes in the motion of the moving body, whereby the compensating control loop stabilizes and controls the changes in the motion of a moving immersed body.

11. A device for restoring the axial orientation and position of a body functioning in a fluid medium, with relative motion therebetween, to a predetermnied orientation and position, comprising at least one hydrofoil susceptible of controlled orientation relative to the axis of the body and in contact with the immersing medium, static pressure sensing means for controlling the orientation of said hydrofoil, said hydrofoil being adapted for restrained movement in a direction substantially perpendicular to the body axis for providing error signals, and a compensating control loop including at least one control means activated by said error signals to provide a control response diminishing the change in axial orientation and position, whereby the axial orientation of the body is restored.

References Cited by the Examiner

UNITED STATES PATENTS

| | | | |
|---|---|---|---|
| 1,083,464 | 1/14 | Roche | 244—82 |
| 1,334,707 | 3/20 | Martin | 244—82 |
| 1,574,567 | 2/26 | Flettner. | |
| 1,777,282 | 10/30 | Constantin. | |
| 2,474,618 | 6/49 | Divoll. | |
| 2,621,873 | 12/52 | Gordon. | |
| 2,749,871 | 6/56 | Scherer et al. | 114—66.5 |

OTHER REFERENCES

Aerospace Engineering, vol. 21, No. 12, December 1962, pages 10–28.

MILTON BUCHLER, *Primary Examiner.*

ANDREW H. FARRELL, *Examiner.*